(12) United States Patent
Shekhter et al.

(10) Patent No.: US 6,849,104 B2
(45) Date of Patent: Feb. 1, 2005

(54) METALOTHERMIC REDUCTION OF REFRACTORY METAL OXIDES

(75) Inventors: Leonid N. Shekhter, Newton, MA (US); Terrance B. Tripp, Westboro, MA (US); Leonid L. Lanin, Belmont, MA (US); Anastasia M. Conlon, Canton, MA (US); Howard V. Goldberg, Framingham, MA (US)

(73) Assignee: H. C. Starck Inc., Newton, MA (US)

( * ) Notice: Subject to any disclaimer, the term of this patent is extended or adjusted under 35 U.S.C. 154(b) by 0 days.

(21) Appl. No.: 09/849,717

(22) Filed: May 4, 2001

(65) Prior Publication Data

US 2002/0066338 A1 Jun. 6, 2002

Related U.S. Application Data

(60) Provisional application No. 60/238,999, filed on Oct. 10, 2000.

(51) Int. Cl.$^7$ .................................................. B22F 9/20
(52) U.S. Cl. .............................. 75/351; 75/363; 75/369; 423/592.1; 423/606; 423/610
(58) Field of Search .......................... 75/352, 363, 369, 75/351; 423/592.1, 606, 610, 592

(56) References Cited

U.S. PATENT DOCUMENTS

| | | | |
|---|---|---|---|
| 1,602,542 A | 10/1926 | Marden | 75/363 |
| 1,728,941 A | 9/1929 | Marden et al. | 75/363 |
| 2,516,863 A | 8/1950 | Gardner | 75/622 |
| 2,881,067 A | 4/1959 | Hivert et al. | 75/369 |
| 2,950,185 A | 8/1960 | Hellier et al. | 75/363 |
| 3,647,420 A | 3/1972 | Restelli | 75/622 |
| 3,658,507 A | 4/1972 | Gohin et al. | 75/369 |
| 4,045,216 A * | 8/1977 | Meyer et al. | 423/606 |
| 4,569,693 A * | 2/1986 | Albrecht et al. | 75/252 |
| 4,954,169 A * | 9/1990 | Behrens | 75/228 |
| 5,082,491 A * | 1/1992 | Rerat | 75/255 |
| 5,356,120 A | 10/1994 | Konig et al. | 266/175 |
| 5,707,599 A * | 1/1998 | Northway | 423/592 |
| 5,769,922 A * | 6/1998 | Higgins et al. | 75/351 |
| 6,096,111 A * | 8/2000 | Polese et al. | 75/228 |
| 6,136,062 A * | 10/2000 | Loffelholz et al. | 75/369 |
| 6,171,363 B1 | 1/2001 | Shekhter et al. | 75/369 |

FOREIGN PATENT DOCUMENTS

GB 2231883 11/1990

* cited by examiner

*Primary Examiner*—George Wyszomierski
(74) *Attorney, Agent, or Firm*—Godfried R. Akorli; Diderico van Eyl

(57) ABSTRACT

High purity refractory metals, valve metals, refractory metal oxides, valve metal oxides, or alloys thereof suitable for a variety of electrical, optical and mill product/fabricated parts usages are produced from their respective oxides by metalothermic reduction of a solid or liquid form of such oxide using a reducing agent that establishes (after ignition) a highly exothermic reaction, the reaction preferably taking place in a continuously or step-wise moving oxide such as gravity fall with metal retrievable at the bottom and an oxide of the reducing agent being removable as a gas or in other convenient form and unreacted reducing agent derivatives being removable by leaching or like process.

25 Claims, 9 Drawing Sheets

METALOTHERMIC REDUCTION OF REFRACTORY METAL OXIDES

CROSS REFERENCE TO RELATED APPLICATION

This application claims priority of the U.S. Provisional Application S. No. 60/238,999 filed Oct. 10, 2000 entitled METALOTHERMIC REDUCTION OF REFRACTORY METAL OXIDES.

FIELD OF THE INVENTION

This invention relates to the production of tantalum, niobium, and other refractory or valve metal powders as well as metal suboxide powders, or alloys thereof by the reduction of the corresponding metal oxide with chemically active metals such as Mg, Ca, Al, and other reducing elements in a self-sustaining reaction zone created by a highly exothermic reaction, but with sufficient control to obtain powders of desired morphology and other physical and electrical characteristics.

BACKGROUND OF THE INVENTION

Refractory metals are members of a group of elements that are difficult to isolate in pure form because of the stability of their compounds, such as oxides, chlorides, fluorides. Since the manufacturing of refractory metals is very complex, we will use tantalum extractive metallurgy as an example to illustrate the development of this technology.

State of the art tantalum powder production is based on the process of reducing potassium heptafluorotantalate ($K_2TaF_7$) with sodium (sodium reduction). The modern method for manufacturing tantalum was developed by Hellier and Martin[1]. A molten mixture of $K_2TaF_7$ and a diluent salt, typically NaCl, KF, and/or KCl, is reduced with molten sodium in a stirred reactor. The manufacturing process requires the removal of the solid reaction products from the retort, separation of the tantalum powder from the salts by leaching with dilute mineral acid, and treatments like agglomeration and deoxidation to achieve specific physical and chemical properties. While the reduction of $K_2TaF_7$ with sodium has allowed the industry to make high performance, high quality tantalum powders primarily used in solid tantalum capacitor manufacturing, there are several drawbacks to this method. It is a batch process prone to the inherent variability in the system; as a result, batch-to-batch consistency is difficult. Using diluent salts adversely impacts the throughput. The removal of chlorides and fluorides in large quantities presents an environmental issue. Of fundamental significance, the process has evolved to a state of maturity such that a significant advance in the performance of the tantalum powder produced is unlikely.

[1]Hellier, E. G. and Martin, G. L., U.S. Pat. No. 2,950,185, 1960.

Over the years, numerous attempts were made to develop alternate ways for reducing tantalum compounds to the metallic state[2,3,4,5,6]. Among these was the use of active metals other than sodium, like calcium, magnesium, and aluminum and raw materials such as tantalum pentoxide and tantalum chloride.

[2] Marden, J. W., U.S. Pat. No. 1,602,542, 1926.
[3] Marden, J. W. and Rich, M. H., U.S. Pat. No. 1,728,941, 1927.
[4] Gardner, D., U.S. Pat. No. 2,516,863, 1946.
[5] Restelli, A., U.S. Pat. No. 3,647,420, 1972.
[6] König, T., et al., U.S. Pat. No. 5,356,120, 1994.

König et al.[6] developed a vertical device for producing finely-divided metal powders (Ta, Nb, W, Zr, etc.) and metal compounds (TiN, TiC, $Nb_2O_5$) by reducing the corresponding metal chloride with hydrogen, methane, or ammonia. While this technique allows continuous production, the generation of large quantities of hydrochloric acid presents serious corrosion and environmental problems. The chlorides are very hygroscopic and, therefore, require special handling with an inert and dry atmosphere. In addition, some of the metal chlorides are very expensive.

[6] König, T., et al., U.S. Pat. No. 5,356,120, 1994.

Kametani et al.[7] developed a process for reducing gaseous titanium tetrachloride with atomized molten magnesium or sodium in a vertical type reactor in the temperature range of 650–900° C. Though the reaction was very exothermic, it was not self-sustaining due to a special effort designed to avoid the formation of titanium-iron intermetallic compounds at high temperatures (the melting point of Fe—Ti eutectic is 1080° C.).

[7] Kametani, H., Sakai, H., GB Patent 2231883, 1990.

Marden,[2] Gohin and Hivert,[8] Hivert and Tacvorian[9] suggested the use of gaseous magnesium to better control the process parameters. The gaseous reducing agent was generated in-situ from a mixture of metal oxide and reducing agent or outside the reactor enclosure. They managed to produce at bench scale fine zirconium, titanium, tungsten, molybdenum, and chromium powders. The method was of batch type. The only controlled parameter was the magnesium (calcium) partial pressure. The kinetics and the temperature of the charge were a function of the gaseous magnesium (calcium) flow rate and were impossible to control due to the condensation of magnesium (calcium) on the cold parts of the reactor. Since both melting and evaporation of Mg (Ca) without condensation on the cold parts was practically impossible, the process had to be periodically stopped for the removal of the build-up. Therefore, continuous operation could not be carried out.

[2] Marden, J. W., U.S. Pat. No. 1,602,542, 1926.
[8] Gohin, G. M., Hivert, A. R., U.S. Pat. No. 3,658,507, 1972.
[9] Hivert, A. R., Tacvorian, S., U.S. Pat. No. 2,881,067, 1959.

Our own experience has been that the production and transport to the reaction zone of a gaseous metal like magnesium is extremely difficult. The metal will condense at any cold spot in the transfer plumbing to form a plug. The metal attacks the container to degrade its integrity over time creating a significant maintenance problem. Control of the reducing agent stoichiometry in the reaction zone is difficult, as it requires maintaining a measured flow rate of a gaseous metal/carrier gas (argon) mixture of known composition into the reactor.

Restelli[5] developed a process for producing niobium and tantalum powders by the reduction of the corresponding oxides with carbon in vacuum. Since the Gibbs Free Energy for the carbothermic reduction reaction of $Ta_2O_5$ becomes negative at approximately 1500° C., the reaction requires high temperature, and particle sintering occurs, thus reducing the surface area of the powder. Another significant drawback of the proposed technology was contamination of the metal powders with carbon, making it very difficult to use them for capacitor manufacturing.

[5] Restelli, A., U.S. Pat. No. 3,647,420, 1972.

Numerous attempts were made to produce tantalum and niobium powders by metalothermic reduction of their oxides with Mg, Al, Ca in a bomb type reactor.[3,4] A blend of finely-divided oxide and metal reducing agent was placed into a reactor and then ignited. The temperature could not be controlled and therefore it was not possible to achieve reproducible physical and chemical properties of the metal powders. The residual Mg (Al, Ca) content was high due to the formation of tantalates and niobates. The process was found to be unsuitable for manufacturing high quality capacitor grade powders.

[3] Marden, J. W. and Rich, M. H., U.S. Pat. No. 1,728,941, 1927.
[4] Gardner, D., U.S. Pat. No. 2,516,863, 1946.

Shekhter et al.[10] described a method for controlled reduction of tantalum and niobium oxide with gaseous magnesium to produce capacitor grade tantalum and niobium powders (batch magnesium reduction). The key is control of the reaction process to achieve essentially isothermal conditions. The batch magnesium reduction process requires excess amount of magnesium to compensate for its condensation on the cold parts of the furnace.

[10] Shekhter, L., Tripp, T., Lanin, L., U.S. Pat. No. 6,171,.363, 2001.

It is a principle object of the present invention to provide a new process for producing high performance, high quality tantalum, niobium, and other refractory metals and blends or alloys thereof by reducing solid/liquid metal oxides in a steady, self-sustaining reaction zone, thereby eliminating one or more, preferably all of the problems associated with the traditional double salt reduction and other processes described above.

It is a further object of the invention to provide a controlled, continuous production method of reduction.

It is a further object of the present invention to provide a reduction method that produces a high quality refractory metal by eliminating halide by-products and carbon contamination.

It is a further object of the invention to provide improved metal forms.

It is a further object of the invention to provide a metal powder having an improved uniform morphology.

SUMMARY OF THE INVENTION

The present invention solves the problems of refractory metal oxide reduction by feeding a blend of the oxide and reducing agent directly into a reactor to achieve a self-sustaining, highly exothermic reaction (continuous magnesium reduction). The use of an oxide/reducing agent blend eliminates the problems associated with the generation and transport of gaseous metal to the reaction zone. The completion of the reduction and the physical properties of the metal powder can be controlled during the process.

The ability of different reactions to become self-sustaining can be better understood from Table 1 in which the enthalpy for the reduction reaction of different oxides with magnesium and their adiabatic temperatures are presented. It can be seen from Table 1 that reactions 1–9 will create a high temperature flash that, under certain conditions discussed below, will become self-sustaining, while reaction 10 does not release enough thermal energy to propagate itself.

The adiabatic temperature is the maximum temperature reached provided that the reaction is carried out in the isolated system (no energy or mass exchange with the surroundings). While the reactor system of this invention is not adiabatic, it can approach this condition because of the extremely rapid reaction rate and, therefore, there is insufficient time for significant energy and mass exchange with the surroundings. The actual temperature of the flash formed by the exothermic reaction is a function of many variables some of which, like thermal energy losses and carrier gas enthalpy, have a thermodynamic origin, while others, like ignition temperature, particle size and surface area of the reagents correlate to the reaction kinetics.

TABLE 1

Summary of calculated adiabatic temperatures

| Number | Oxide | $\Delta H_{25° C.}$ (Kcal/mole oxide) | Adiabatic Temperature (° C.) |
|---|---|---|---|
| 1 | $Ta_2O_5$ | −229 | 2832 |
| 2 | $Nb_2O_5$ | −264 | 2832 |
| 3 | $NbO_2$ | −97 | 2798 |
| 4 | NbO | −43 | 2241 |
| 5 | $Cr_2O_3$ | −158 | 2708 |
| 6 | $WO_3$ | −230 | 3437 |

TABLE 1-continued

Summary of calculated adiabatic temperatures

| Number | Oxide | $\Delta H_{25° C.}$ (Kcal/mole oxide) | Adiabatic Temperature (° C.) |
|---|---|---|---|
| 7 | $V_2O_5$ | −348 | 2990 |
| 8 | $MoO_3$ | −253 | 3813 |
| 9 | $MoO_2$ | −147 | 2946 |
| 10 | $ZrO_2$ | −25 | 862 |

The present invention also shows that the self-sustaining reaction zone position and its temperature can be efficiently controlled by maintaining a consistent feeding rate, ignition (furnace) temperature, and inert carrier gas flow rate. Achieving a consistent oxide flow is not a trivial issue since some of the refractory metal oxides are dielectrics and have a natural tendency to accumulate static electricity due to the friction of the oxide particles against each other. Agglomerate-void formation makes it virtually impossible to maintain a consistent feeding over time and adversely impacts both the kinetics and the control of the reduction reaction.

We discovered that feeding a blend of oxide and metal powder (Mg, Ca, Al, etc.) helps to dissipatic the static electricity and break up the agglomerates. The metal powder should be fine enough to vaporize/melt rapidly in the reaction zone. As a result of the use of blends, material flowability is significantly improved. This permits a stable, consistent self-sustaining reduction reaction to occur.

The reaction zone temperature increases as the feeding rate goes up. When the feeding rate is low enough, the amount of energy released during the reaction is less than the value of energy losses. The reaction cannot self-sustain itself and it is impossible to achieve a stable self-sustaining reaction with a complete reduction of the metal oxide.

For each exothermic reaction there is a starting (ignition) temperature at which the reaction becomes a self-sustaining one. For example, the ignition temperature is approximately 600° C. for the reaction of $Ta_2O_5$ with Mg. The energy required for the ignition of the reagents comes from the furnace (see Examples). The energy required to make the reaction self-sustaining comes from the chemical energy released by the reduction reaction.

It is advisable that the reaction zone temperature should not exceed the melting point of the oxide (See Table 2) because if the oxide melts, it can cause the coalescence of particles. Particles augmentation will lead to a significant decrease in the residence time in the reaction zone, which in turn will affect the completion of the reaction.

TABLE 2

The melting point of various metal oxides

| Oxide | Melting Point ° C. |
|---|---|
| $Nb_2O_5$ | 1512 |
| $Ta_2O_5$ | 1785 |
| $NbO_2$ | 1902 |
| NbO | 1937 |

Even though the reduction reaction takes place in a wide temperature range (onset-flash temperature), physical and chemical properties can be kept under control due to the steady parameters of the self-sustaining reaction zone. The higher the temperature is, the more agglomerated the powder is, and the lower is its surface area.

For the proposed process, the reducing agent (Mg, Al, Ca, etc.) does not need to be in gaseous form. The reduction reaction usually starts when the reducing agent is in the solid or liquid state. When the reaction zone temperature exceeds the boiling point of the reducing agent, the oxide will be reduced with gaseous metal. When the boiling point of the reducing agent is higher than the reaction zone temperature, it will be in a molten state (See Table 3), but can still have sufficient vapor pressure to sustain the reaction.

TABLE 3

The melting and boiling points of various metals

| Metal | Melting Point (° C.) | Boiling Point (° C.) |
|---|---|---|
| Ca | 839 | 1483 |
| Al | 660 | 2467 |
| Mg | 650 | 1105 |

Different types of equipment can be used to run the present process continuously, such as a vertical tube furnace, a rotary kiln, a fluid bed furnace, a multiple hearth furnace, and a SHS (self-propagation high-temperature synthesis) reactor.

DETAILED DESCRIPTION OF PREFERRED EMBODIMENTS

Figure 1:
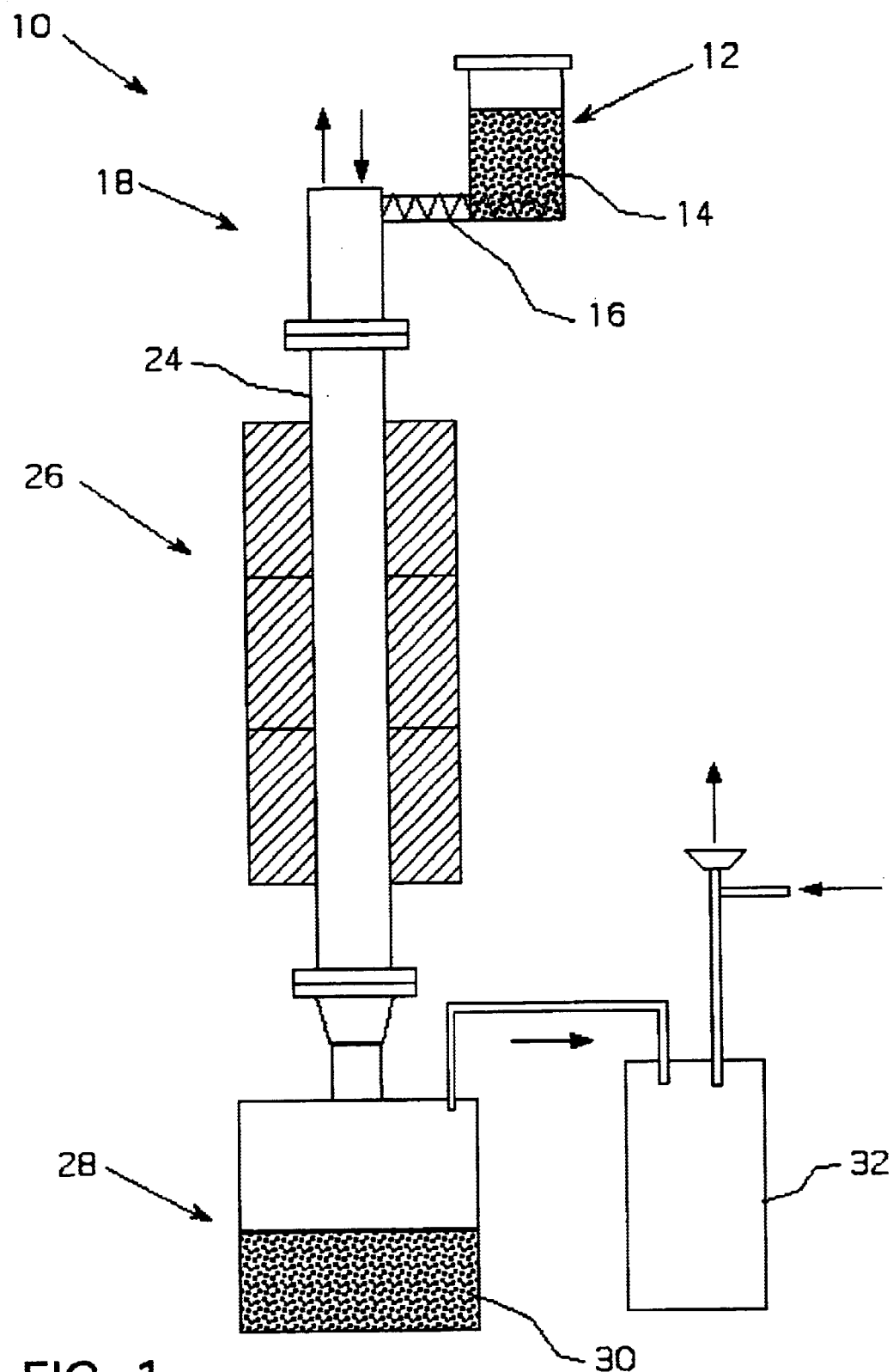
FIG. 1 is a schematic diagram of a vertical tube furnace used in one embodiment of the present invention.

FIG. 1 schematically shows an apparatus for implementing the process of the present invention. A vertical tube furnace 10 comprises a hopper 12 which holds the refractory metal oxide powder and reducing agent powder, provided as a mixed blend 14 (in other embodiments the reagents can be separately fed), a screw feeder 16 which consistently moves the blend 14 out of the hopper 12, an oxide dispersion device 18 which breaks up the oxide particles being feed into it from the screw feeder 16, a pipe or reactor 24 connected to the oxide dispersion device 18 heated by a three zone electrical furnace 26 where the self-sustaining reaction takes place, a receiver 28 connected to the reactor 24 where the reduction products 30 are collected, and a trap 32 where the unreacted (condensed) reducing agent powder is collected. The length of the reactor's hot zone is approximately 5 feet (~1.5 m).

For the present process, the vertical tube furnace has a number of advantages over other potential types of equipment. The vertical tube furnace configuration minimizes contact of the products with the reactor wall and allows the free flow of the reactants and products thus minimizing interaction of the product particles. Losses due to dust formation are also minimized. The vertical tube furnace can be configured to operate continuously. The vertical tube configuration also promotes maximum exposure of the oxide to the reducing agent to achieve the reaction rate necessary to maintain a stable self-sustaining reaction.

Figure 2:
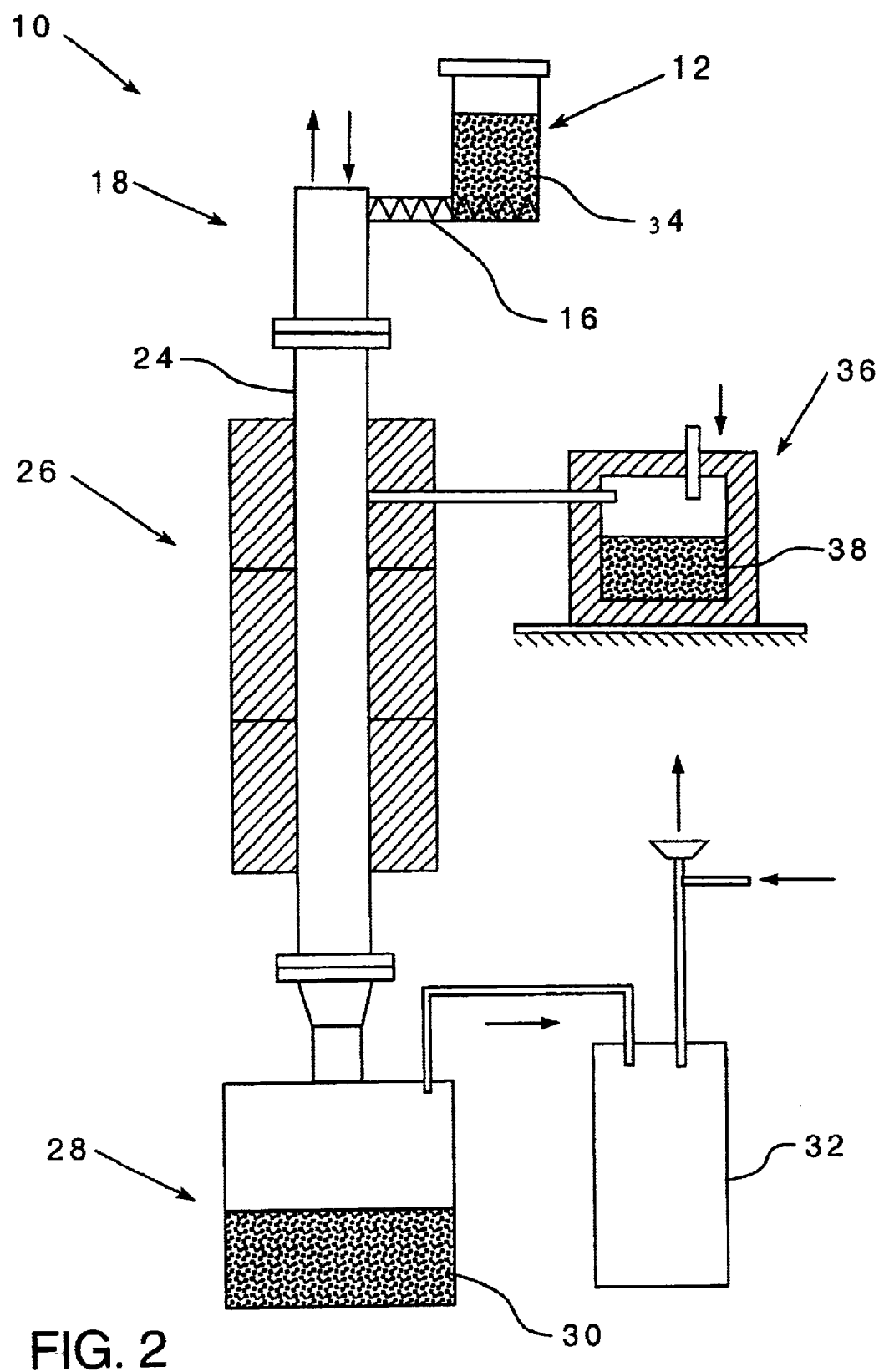
FIG. 2 is a schematic diagram of a vertical tube furnace as described and used in Example 1 below.

FIG. 2 schematically shows the vertical tube furnace 10 implementing the process described in Example 1 but with a variation as to material supply. The process is the same as shown and described in FIG. 1 above except that the hopper 12 holds only the refractory metal oxide powder 34. A melter 36 holds the reducing agent 38, magnesium, and feeds the magnesium 38 directly into the furnace area using a transpiration technique.

EXAMPLES

The invention is now further disclosed with reference to the following non-limiting Examples.

Example 1

Tantalum pentoxide was reduced with gaseous magnesium as shown in FIG. 2. The temperature in the magnesium melter was 975° C., while the temperature in the furnace was maintained at 985° C. to prevent magnesium condensation on the cold parts. The argon flow through the melter and the furnace was 55 scfh. The average oxide feeding rate 1.5 kg/h. The reduction lasted 3 hours. After passivation, the receiver was opened and the products were leached with dilute sulfuric acid to remove residual magnesium and magnesium oxide. The cake was then dried in the oven at 65° C. and analyzed. The surface area of the reduced powder was 17 $m^2/g$, the bulk density was 26.8 $g/in^3$, and the oxygen content was 13.2 W/W %. The reduction was only 60% complete due to the inability to maintain a consistent oxide and magnesium feed rates, which caused instability in the self-sustaining reaction during the course of the run.

Example 2

Figure 3:
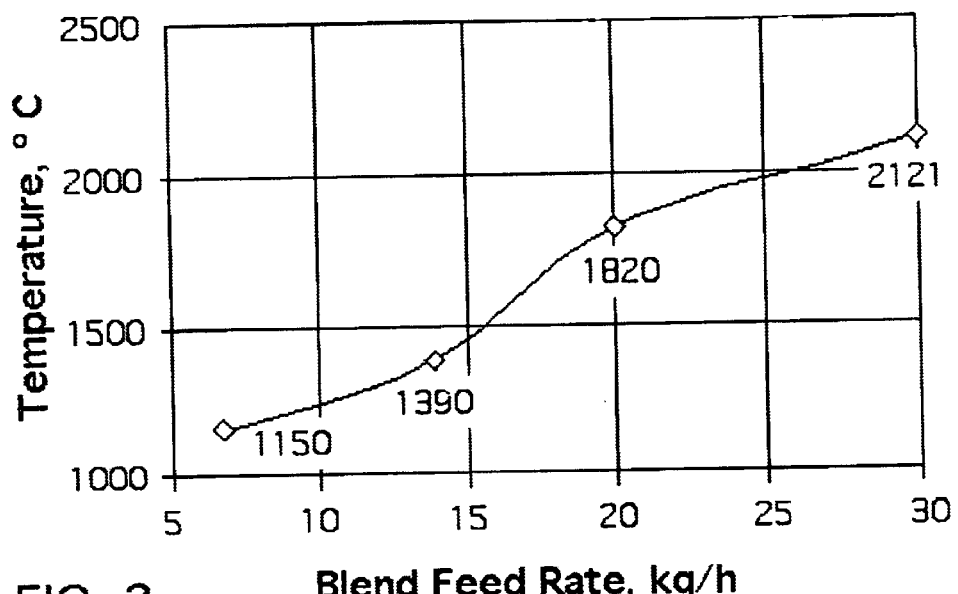
FIG. 3 is a graph of the calculated reaction zone temperature vs. the blend feed rate for a furnace temperature of 1150° C.

The reaction zone temperature was estimated from energy balance calculations and the results are plotted in FIG. 3 as a function of the blend feed rate. The following assumptions were made:

(1) The value of the energy losses was estimated to be 30% of the energy input. This is a reasonable approximation for the furnace design used.

(2) The kinetics of the chemical reaction is instantaneous and is not a function of either oxide or magnesium particle size.

(3) The argon flow rate was 1.8 $Nm^3/hr$.

(4) The furnace temperature was 1150° C.

The graph in FIG. 3 shows the reaction zone temperature may change significantly depending on the feed rate. At 7 kg/hr blend feed rate, the reaction zone temperature does not differ from the furnace temperature while at 30 kg/hr feed rate, it exceeds the melting point of tantalum pentoxide. When the reaction zone temperature is higher than the oxide melting point, there is a real possibility of coalescence, which can adversely impact the reaction due to the drastic reduction of the residence time.

Example 3

Figure 4:
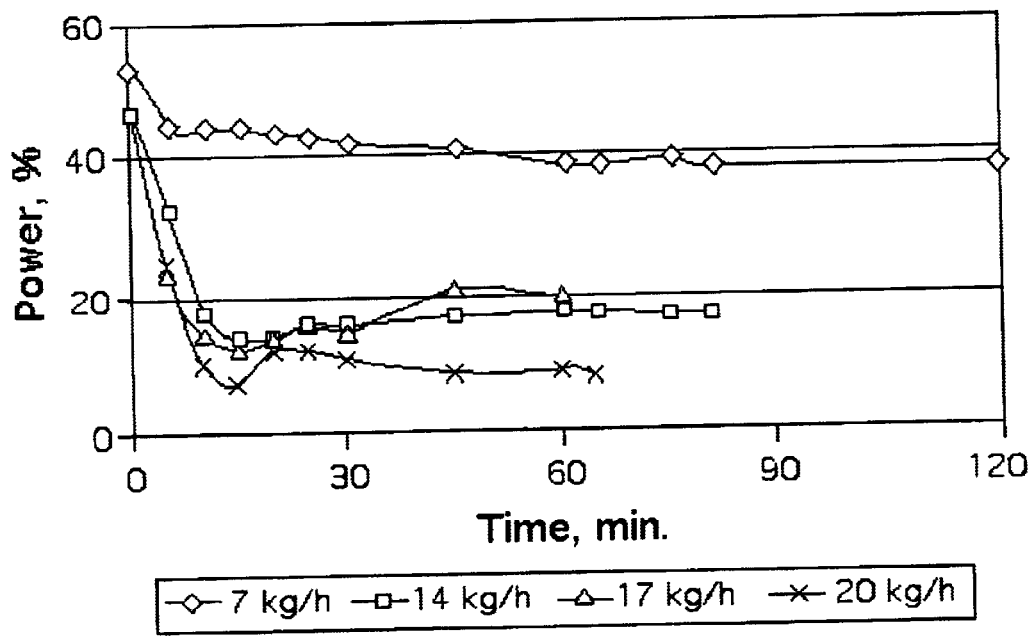
FIG. 4 is a graph of furnace power vs. time for various blend feed rates.

FIG. 4 shows the furnace power readings during the reduction of $Ta_2O_5$ with magnesium power as a function of time for several blend feed rates. The graph shows the value of power change as a function of blend feed rate. The higher the feed rate, the greater is the power drop. In fact, at 20 kg/hr blend feed rate the electric power input dropped from 46 to 6%. In other words, the furnace was not supplying energy to the system. This is strong evidence that a stable self-sustaining reaction exists in the reactor.

Examples 4–8

Table 4 summarizes results for runs made at several different blend feed rates. The magnesium stoichiometry was 100.5%. The powders made in Examples 5 through 7 had properties suitable for making capacitor grade tantalum powder. The reaction zone temperature was just below the melting point of tantalum pentoxide (See Table 3 and FIG. 4). The powders produced at lower and higher feed rates and associated reaction zone temperatures were not as well reduced. The reduction was especially poor for the powder made at the highest feed rate and associated reaction zone temperature (Example 8).

TABLE 4

Results for Examples 4–8

| Example (#) | Feed Rate (Kg/hr) | Reaction Zone Temp. (° C.) | Oxygen (%) | Surface Area (m²/gm) | Bulk Density (gm/in³) | Reduction (%) |
|---|---|---|---|---|---|---|
| 4 | 5 | 1150 | 6.1 | 8 | 20 | 78 |
| 5 | 14 | 1390 | 5.8 | 11 | 18 | 86 |
| 6 | 17 | 1650 | 5.3 | 9 | 20 | 85 |
| 7 | 20 | 1780 | 4.8 | 10 | 17 | 88 |
| 8 | 29 | 2120 | 9.5 | 6 | 27 | 54 |

Example 9

Table 5 is a summary of the particle size distribution of the powders described in Examples 4–8. The particle size distributions were measured using a Malvern Mastersizer 2000 particle size analyzer without ultrasonic treatment. For comparison, results for a powder made by the batch reduction of oxide and a 100 KCV class powder made by the sodium reduction process are included. The batch magnesium reduction was carried out in the tube furnace at 1000° C. for 6 hours. The sodium reduction process used is well known to those skilled in the art.

TABLE 5

Summary of Particle Size Distribution Results

| Example # | D90 (μ) | D50 (μ) | D10 (μ) | Surface Area (m²/gm) |
|---|---|---|---|---|
| 4 | 118 | 33 | 8 | 0.36 |
| 5 | 171 | 30 | 5 | 0.48 |
| 6 | 252 | 50 | 8 | 0.32 |
| 7 | 170 | 27 | 5 | 0.48 |
| 8 | 225 | 47 | 6 | 0.44 |
| Batch Reduced | 61 | 29 | 13 | 0.28 |
| Sodium Reduced | 435 | 180 | 16 | 0.25 |

Figure 5:
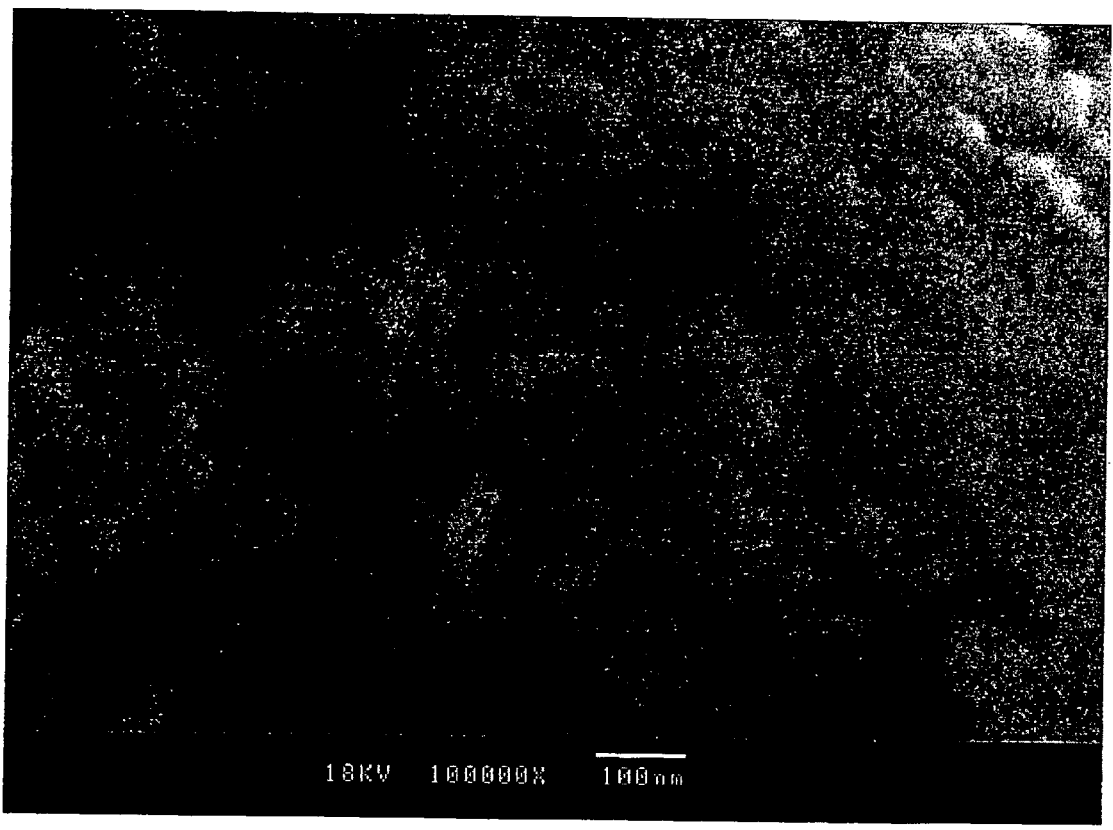
FIG. 5 is a scanning electron photomicrograph showing a powder produced according to one embodiment of the present invention.
Figure 6:
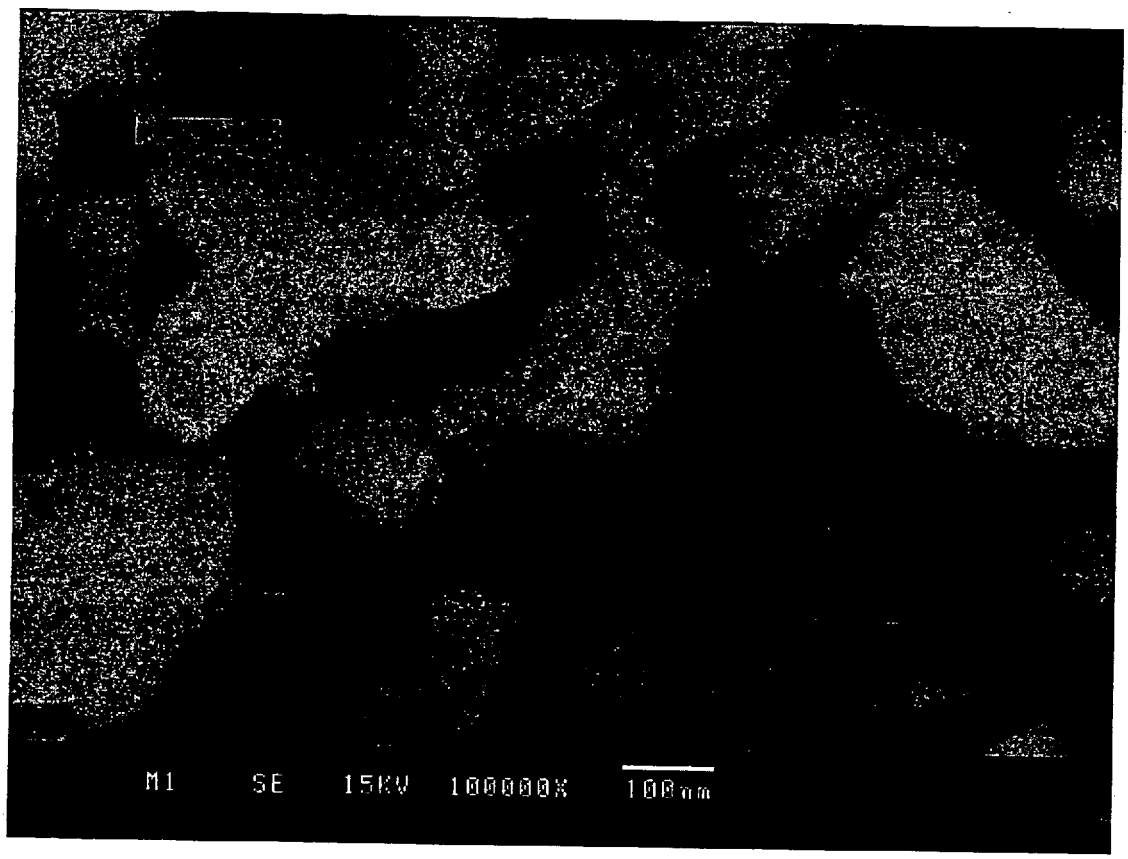
FIG. 6 is a scanning electron photomicrograph showing a powder produced according to a batch magnesium reduction process.
Figure 7:
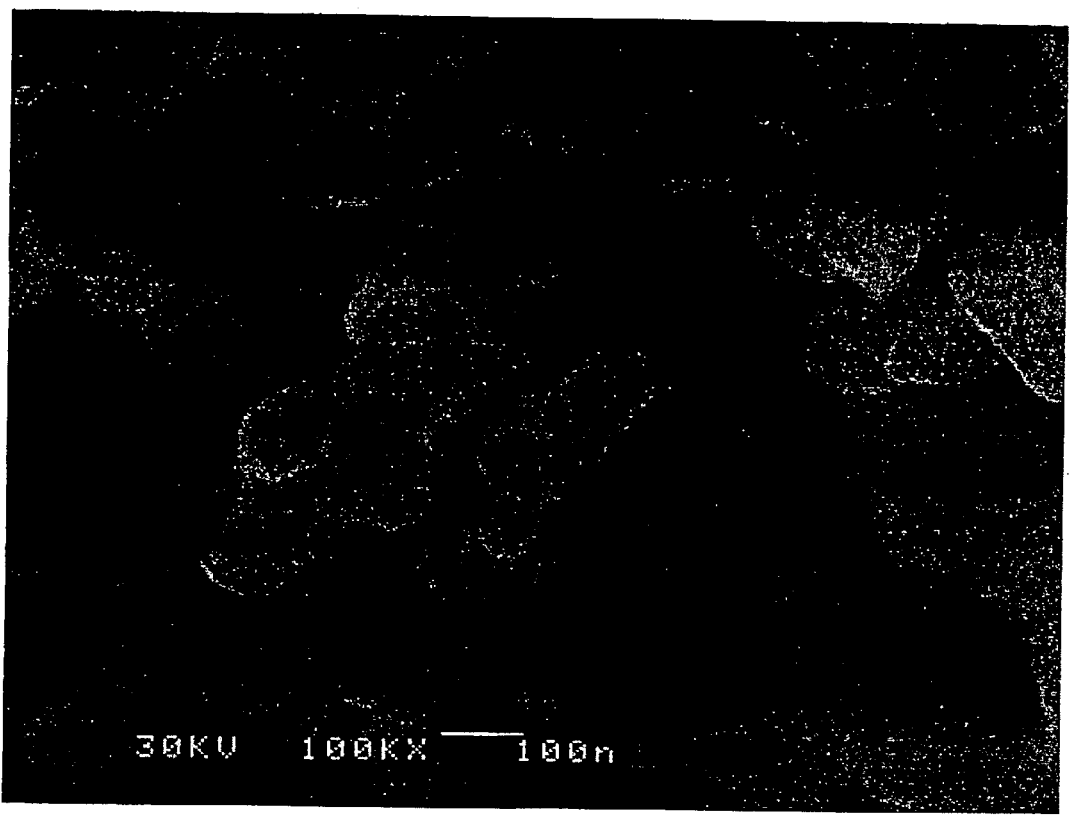
FIG. 7 is a scanning electron photomicrograph showing a powder produced according to a sodium reduction process.

In general, the powders made by the continuous magnesium reduction process of the present invention have higher calculated surface areas and significantly different particle size distributions, as quantified by the D values, than the powders made by the batch magnesium reduction or sodium reduction processes. The differences in powder morphology can be further seen in the scanning electron microscope (SEM) photographs shown in FIGS. 5–7. FIG. 5 shows a representative SEM photomicrograph of a powder produced by the parameters of Example 7. FIGS. 6 and 7 show representative SEM photomicrographs of powders produced by the magnesium reduction and sodium reduction processes, respectively. As shown in FIG. 5, the powder has a very uniform particle size distribution and much smaller overall particle size (approximately 25 mn) than the powders made by the batch magnesium reduction process shown in FIG. 6 or the sodium reduction process shown in FIG. 7. The average size of the agglomerates is ~100 nm.

Figure 8:
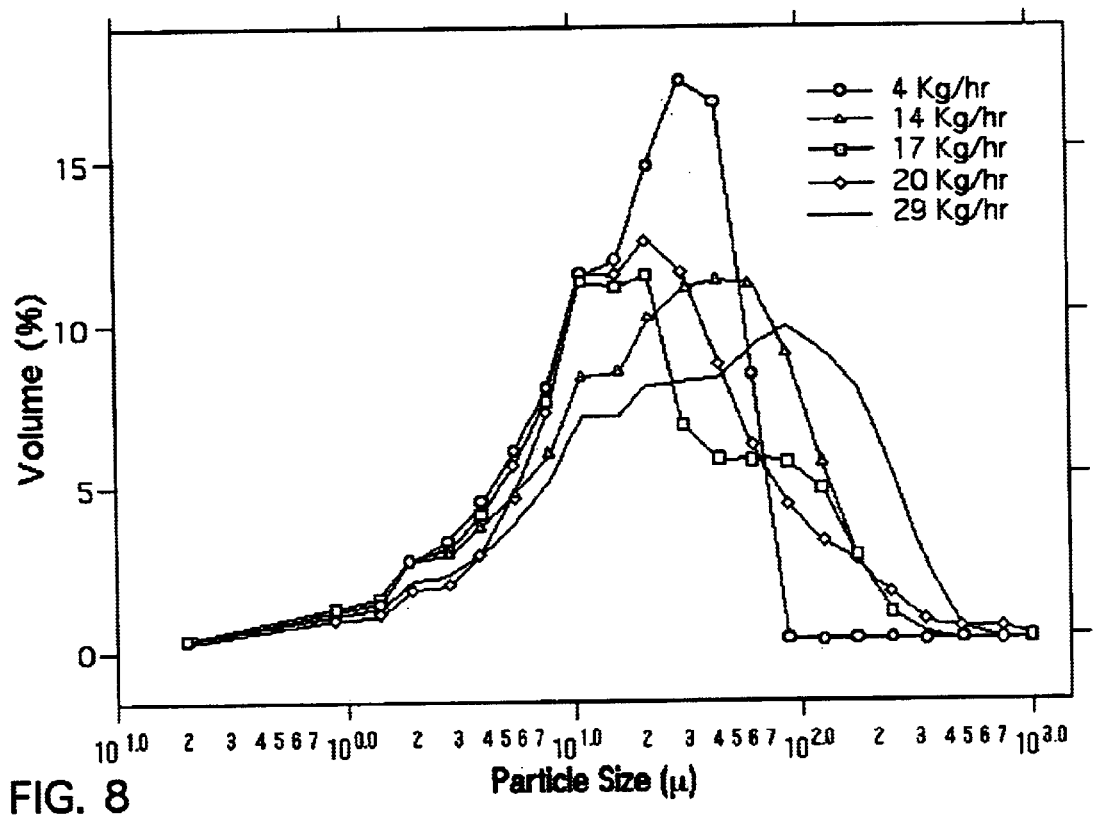
FIG. 8 is a graph of the particle size distribution vs. the volume for various blend feed rates.

FIG. 8 is a plot of the particle size distribution of the powders made by the continuous magnesium reduction process of the present invention. The distribution shifts to larger particle size as the blend feed rate increases. The most favorable particle size distribution was obtained with the powder made at a blend feed rate of 17 kg/hr. The distribution was bimodal in this case.

Examples 10–13

Table 6 lists the calculated average pore diameters (APD) for the sintered pellets made from powders produced by the present invention (continuous magnesium reduction), batch magnesium reduction, and sodium reduction before and after anodization at 30 V and 50 V. The pellets were pressed to a green density of 5.0 gm/cc and sintered at 1210° C. for 20 minutes. They were anodized in 0.1 V/V % $H_3PO_4$ solution at 80° C. at a current density of 100 mA/g with a 2 hour hold at the formation voltage. The pore size distributions were measured using a Micromiretics AutoPore III Model mercury porosimeter. Although the sintered pellets made by the batch magnesium and sodium reduction processes have higher average pore diameters, the loss in APD upon anodization to 30 V and 50 V is less for the pellets made from powders produced by the continuous magnesium reduction process of the present invention. This is a sign of the improved morphology of the pellets made from the continuous magnesium reduction powders of the present invention relative to pellets made from powders produced by the batch magnesium or sodium reduction processes.

TABLE 6

Summary of Calculated Average Pore Diameters for Sintered and Anodized Pellets

| Example # | Reduction Type | Feed Rate (kg/hr) | APD (0) ($\mu$) | APD (30) ($\mu$) | APD (50) ($\mu$) | % Change 0 V–30 V | % Change 0 V–50 V |
|---|---|---|---|---|---|---|---|
| 10 | Continuous | 4 | 0.29 | 0.24 | 0.23 | 17 | 21 |
| 11 | Continuous | 9 | 0.32 | 0.29 | 0.27 | 9 | 16 |
| 12 | Batch | — | 0.34 | 0.25 |  | 26 |  |
| 13 | Sodium | — | 0.39 | 0.21 | 0.18 | 46 | 54 |

Figure 9:
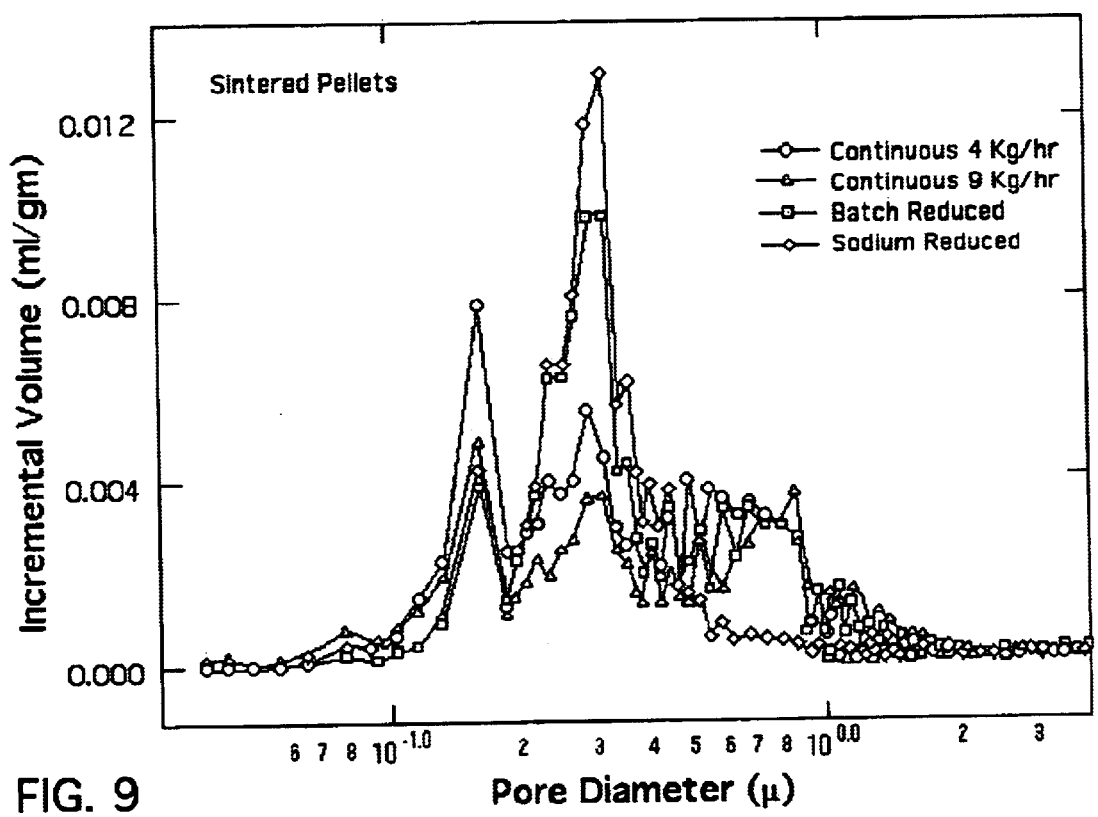
FIG. 9 is a graph of the sintered pellet pore size distribution vs. the incremental volume for pellets made from powders reduced by various reduction processes.
Figure 10:
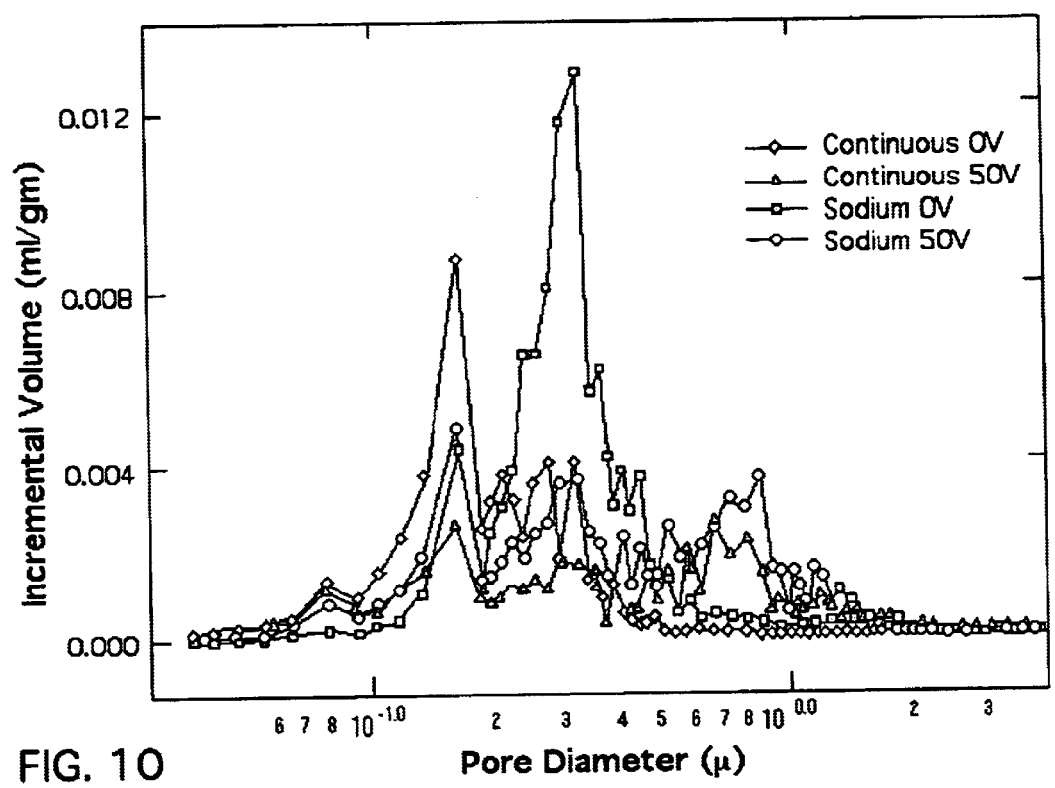
FIG. 10 is a graph of the pellet pore size distribution vs. the incremental volume before and after anodization to 50V for pellets made from powders produced by the continuous magnesium reduction process of the present invention and produced by a sodium reduction process.

Further evidence for the improved morphology of sintered pellets made from the continuous magnesium reduced powder of the present invention relative to those made from sodium reduced powder is seen in the pore size distributions plotted in FIGS. 9 and 10. FIG. 9 shows results for sintered pellets made from powders reduced by various reduction processes. The pellets made from powders produced by the continuous magnesium reduction process of the present invention and batch magnesium reduction process have a higher fraction of large pores compared to the pellets made from sodium reduced powders. Large pores enhance the ability to impregnate the pellets with solid electrolyte during the capacitor manufacturing process. FIG. 10 gives results before and after anodization at 50 V for pellets made from powders produced by the continuous magnesium reduction process of the present invention and produced by a sodium reduction process. The pellets made from powder produced by the sodium reduction process lost significant porosity after anodization especially in the 0.3$\mu$ pore diameter range. In contrast, there was little change in the porosity of the pellet made from the continuous magnesium reduced powder of the present invention after anodization to 50 V.

Example 14

Table 7 summarizes the wet and solid capacitance results for the Example 10–13 powders. The solid capacitor 30 V to 50 V capacitance change (CC) for the capacitors made from the continuous reduction powders of the present invention is less than this change for the sodium reduced powder pellets. The wet to solid capacitance recovery (CR) is higher for the capacitors made from the continuous magnesium reduction powders of the present invention than for the batch magnesium reduced and sodium reduced powder capacitors. The wet to solid capacitance recovery of the continuous reduction powders of the present invention increases as the blend feed rate increases. Finally, the equivalent series resistance (ESR) of the capacitors produced from the continuous reduction powders of the present invention are significantly lower, especially at 50 V, than the ESR of the solid capacitors made from sodium reduced powders. These results are further evidence for the better morphology of pellets made from powders produced by the continuous reduction process of the present invention and suggest that powders made at higher blend feed rates (up to 20 kg/hr) have the best morphological properties for making solid capacitors.

TABLE 7

Summary of Wet and Solid Capacitance Data

| Example # | Wet Cap ($\mu$F) | | Solid Cap ($\mu$F) | | CC | CR (%) | | ESR (Ohms) | |
|---|---|---|---|---|---|---|---|---|---|
|  | 35 V | 50 V | 30 V | 50 V | (%) | 30 V | 50 V | 30 V | 50 V |
| 10 | 497 | 196 | 297 | 122 | 59 | 60 | 62 | 1.9 | 4.2 |
| 11 | 430 | 182 | 410 | 175 | 57 | 95 | 96 | 0.8 | 2.0 |
| 12 | 514 | 237 | 388 | 144 | 63 | 75 | 61 | 1.1 | 3.6 |
| 13 | 546 | 206 | 226 | 64 | 72 | 42 | 31 | 2.9 | 9.0 |

Example 15

Table 8 contains a summary of the metallic elements chemistry of the powders described in Examples 4–8. Data for a typical 100 KCV sodium reduced powder are included for comparison. The chromium, iron, nickel, potassium and sodium contents of the powders made by the continuous reduction process of the present invention are less than the detection limit. In contrast, there are detectable concentrations of these elements in the powder made by the sodium reduction process.

TABLE 8

Summary of Metallics Chemistry

| Example # | Feed Rate (kg/hr) | Cr (ppm) | Fe (ppm) | Ni (ppm) | K (ppm) | Na (ppm) |
|---|---|---|---|---|---|---|
| 4 | 5 | <5 | <5 | <5 | <10 | <1 |
| 5 | 14 | <5 | <5 | <5 | <10 | <1 |
| 6 | 17 | <5 | <5 | <5 | <10 | <1 |
| 7 | 20 | <5 | <5 | <5 | <10 | <1 |
| 8 | 29 | <5 | <5 | <5 | <10 | <1 |
| Na Reduced |  | 10 | 5 | 30 | 35 | 2 |

Example 16

The proposed method can be used for the production of metal suboxides through the control of such reduction parameters as magnesium stoichiometry and blend feed rate. For example, a blend of niobium suboxide ($NbO_2$) with surface area of 0.44 m$^2$/g and magnesium powder was processed through the vertical furnace configuration shown in FIG. 2 at 17 kg/h blend feed rate. The magnesium stoichiometry was 100.5%. The furnace was kept at the temperature of 1150° C. The powder produced contained 13.6% O (the oxygen content in NbO is 14.7%) and 360 ppm N and had the surface area of 2.4 m$^2$/g.

It is to be understood that the above-described embodiments are simply illustrative of the principles of the invention. Various and other modifications, changes, details and uses may be made by those skilled in the art which will embody the principles of the invention and fall within the spirit and scope thereof.

What is claimed is:

1. A method comprising:
   (a) continuously feeding, into a furnace, (i) a free-flowing oxide particle component selected from the group consisting of metal oxide particles, metal alloy oxide particles, refractory metal suboxide powders, refractory metal alloy suboxide powders, and mixtures thereof, and (ii) a free-flowing reducing agent selected from the group consisting of magnesium, aluminum, calcium, and mixtures thereof;
   (b) igniting the oxide particle component and the reducing agent at a reaction zone, starting a reaction that is sufficiently exothermic to form a high temperature, self-sustaining flash; and
   (c) producing a free-flowing reduced oxide powder selected from the group consisting of refractory metal powders, refractory metal alloy powders, refractory metal suboxide powders, refractory metal alloy suboxide powders, and mixtures thereof.

2. The method of claim 1, wherein the furnace has a first temperature at a location that is not the reaction zone and the flash is at a second temperature that is greater than the first temperature.

3. The method of claim 2, wherein the (i) free-flowing oxide particle component and the (ii) free-flowing reducing agent are introduced at a substantially constant rate and the second temperature remains substantially constant.

4. The method of claim 1, wherein the flash has a temperature that is less than or equal to the melting point of the refractory metal oxide or refractory alloy metal oxide.

5. The method of claim 1, wherein the oxide particle component and the reducing agent are introduced as a free-flowing mixture and the self-sustaining flash is a stable self-sustaining flash.

6. A method comprising:
   (a) continuously feeding, into a furnace having a first temperature at a location that is not a reaction zone, a free-flowing mixture of (i) an oxide particle component selected from the group consisting of refractory metal oxide particles, refractory metal alloy oxide particles, refractory metal suboxide powders, refractory metal alloy suboxide powders, and mixtures thereof, and (ii) a reducing agent selected from the group consisting of magnesium, aluminum, calcium, and mixtures thereof;
   (b) igniting the free-flowing mixture at the reaction zone, starting a reaction that is sufficiently exothermic to form a high temperature, stable self-sustaining flash; and
   (c) forming a free-flowing reduced oxide powder selected from the group selected from the group consisting of refractory metal powders, refractory metal alloy powders, and mixtures thereof;
   wherein the free-flowing mixture is introduced at a substantially constant rate and the second temperature remains substantially constant.

7. A method comprising:
   (a) providing a refractory metal oxide component as a free-flowing continuous feed;
   (b) contacting the free-flowing refractory oxide component with a free-flowing reducing agent selected from the group consisting of magnesium, aluminum, calcium, and mixtures thereof, thereby creating a static mixture or a dynamically formed mixture;
   (c) reducing the free-flowing refractory oxide feed in a reaction zone by heating the mixture in a reaction vessel to create a highly exothermic self-sustaining reaction, the exothermic reaction being triggered by heating the mixture to an ignition temperature or by adding a further reagent or catalyst; and
   (d) recovering a high surface area powder, substantially free of impurities, which is selected from the group consisting of refractory metal powders, refractory metal alloy powders, refractory metal suboxide powders, refractory metal alloy suboxide powders.

8. The method of claim 7, wherein the reducing agent is in solid form in the mixture.

9. The method of claim 7, wherein the refractory metal oxide component is in solid form in the mixture.

10. The method of claim 7, wherein the mixture is formed prior to being fed into the reaction zone.

11. The method of claim 7, wherein the mixture is formed within the reaction zone.

12. The method of claim 7, wherein the reaction vessel is a vertical tube furnace.

13. The method of claim 7, wherein the refractory metal oxide component is selected from the group consisting of tantalum pentoxide, niobium pentoxide, niobium suboxide, tungsten trioxide, chromium trioxide, molybdenum trioxide, titanium dioxide, vanadium pentoxide and niobium oxide, mixtures of at least one of the foregoing and zirconium dioxide, and mixtures thereof.

14. The method of claim 7, wherein the refractory metal powder, the refractory metal alloy powder are selected from the group consisting of tantalum, niobium, molybdenum, tungsten, vanadium, chromium, titanium, and combinations thereof.

15. The method of claim 7, wherein the refractory metal suboxide powder is selected from the group consisting of niobium suboxide, tungsten suboxide, molybdenum suboxide, vanadium suboxide, titanium suboxide, and chromium suboxide.

16. The method of claim 7, wherein the temperature in the reaction zone is less than or equal to the melting point of the refractory metal feed.

17. The method of claim 7, wherein the powder further comprises agglomerates having a substantially uniform particle size distribution.

18. The method of claim 7, wherein the powder further comprises agglomerates having a bimodal particle size distribution.

19. The method of claim 7 further comprising adjusting at least one process parameter to control the chemical and physical properties of the powder, wherein the process parameter is selected from the group consisting of reagent feed rates, ignition temperature, steady state energy supply, reagent particle size, reducing agent stoichiometry, and inert carrier gas flow rate.

20. The method of claim 7, wherein the reducing agent in the mixture is provided in an amount substantially equal to the stoichiometric quantity required to react with the refractory metal oxide component.

21. The method of claim 7 further comprising forming the powder into pellets at an appropriate sintering temperature.

22. The method of claim 21 further comprising forming the sintered pellets into electrolytic capacitors.

23. The method of claim 7, wherein the recovering step (d) further comprises agglomerating and/or deoxidizing.

24. The method of claim 23 further comprising forming the powder into pellets at an appropriate sintering temperature.

25. The method of claim 24 further comprising forming the sintered pellets into electrolytic capacitors.

* * * * *